United States Patent
Edwards et al.

(10) Patent No.: US 9,030,426 B2
(45) Date of Patent: May 12, 2015

(54) METHOD OF MINIMIZING CHARGES ACCUMULATED AT COMMON ELECTRODE OF DISPLAY PANEL

(75) Inventors: Martin Edwards, Sussex (GB); Richard Ayres, Surrey (GB)

(73) Assignees: Innolux Corporation, Miao-Li County (TW); Innocom Technology (Shenzhen) Co., Ltd., Shenzhen, Guangdong Province (CN)

( * ) Notice: Subject to any disclaimer, the term of this patent is extended or adjusted under 35 U.S.C. 154(b) by 302 days.

(21) Appl. No.: 13/476,059

(22) Filed: May 21, 2012

(65) Prior Publication Data

US 2013/0307791 A1 Nov. 21, 2013

(51) Int. Cl.
*G06F 3/041* (2006.01)
*G06F 3/044* (2006.01)

(52) U.S. Cl.
CPC ...................................... *G06F 3/044* (2013.01)

(58) Field of Classification Search
CPC ................. G06F 3/044; G06F 3/0418
USPC .................................................. 345/173–176
See application file for complete search history.

(56) References Cited

U.S. PATENT DOCUMENTS

2013/0016062 A1* 1/2013 Nihei et al. .................... 345/174

\* cited by examiner

*Primary Examiner* — Sahlu Okebato
(74) *Attorney, Agent, or Firm* — Li & Cai Intellectual Property (USA) Office

(57) ABSTRACT

A touch system including a display panel associated with a first electrode, a touch panel having a plurality of touch electrodes having a plurality of transmit electrodes and a plurality of receive electrodes, and a voltage generating circuit is provided. When a mutual capacitance between a selected transmit electrode and a selected receive electrode is measured, the voltage generating circuit applies a first voltage of a first polarity to the selected transmit electrode, and substantially concurrently applies a second voltage of a second polarity that is opposite to the first polarity to at least one other transmit electrode for minimizing charges associated with an application of the first voltage to the selected transmit electrode and accumulated at the first electrode.

9 Claims, 5 Drawing Sheets

METHOD OF MINIMIZING CHARGES ACCUMULATED AT COMMON ELECTRODE OF DISPLAY PANEL

BACKGROUND OF THE INVENTION

1. Field of the Invention

The disclosure relates to a touch system utilizing a mutual capacitive method for touch position detection, and more particularly, to a method of minimizing charges accumulated at an electrode associated with a display panel of the touch system when a touch position on a touch panel of the touch system is detected.

2. Description of Related Art

For detecting the touch position on the touch panel having a plurality of transmit electrodes, sensing signals, which could be predetermined voltage pulses, are typically employed to be applied to the transmit electrodes in a predetermined sequence. And charges corresponding to the sensing signals (or the applied voltage pulses) are collected by receive electrodes of the touch panel, creating multiple electrical fields. At the time a touch input on the touch panel is received, capacitances in the touch panel would vary as the result of changes in the electrical fields before the touch position of the touch input could be detected.

However, charges corresponding to the sensing signals are coupled to the electrode of the display panel because of the presence of parasitic capacitances formed between the transmit electrodes and that particular electrode, which may adversely affect the performance of the touch system.

BRIEF SUMMARY OF THE INVENTION

The primary objective of the disclosure is to provide a touch system. The touch system may include a display panel associated with an electrode (for example, a first electrode). The touch system may further include a touch panel having a plurality of touch electrodes, with the touch electrodes having a plurality of transmit electrodes and a plurality of receive electrodes, and a voltage generating circuit.

When a mutual capacitance between a selected transmit electrode of the plurality of the transmit electrodes and a selected receive electrode of the plurality of the receive electrodes is measured, the voltage generating circuit applies a first voltage of a first polarity to the selected transmit electrode, and substantially concurrently applies a second voltage of a second polarity that is opposite to the first polarity to at least one other transmit electrode for minimizing charges associated with an application of the first voltage to the selected transmit electrode being accumulated at the first electrode.

The disclosure further discloses a method of minimizing the charges associated with the application of the first voltage. The method may include determining at least one of the transmit electrodes adjacent to a selected transmit electrode to which a first voltage of a first polarity is applied, when a mutual capacitance between the selected transmit electrode of the plurality of the transmit electrodes and a selected receive electrode of the plurality of the receive electrodes is measured, and substantially concurrently causing a second voltage of a second polarity opposite to the first polarity to be applied to the determined transmit electrode.

In order to further the understanding regarding the disclosure, the following embodiments are provided along with illustrations to facilitate the disclosure of the disclosure.

DETAILED DESCRIPTION OF THE INVENTION

The aforementioned illustrations and following detailed descriptions are exemplary for the purpose of further explaining the scope of the disclosure. Other objectives and advantages related to the disclosure will be illustrated in the subsequent descriptions and appended drawings.

Figure 1:
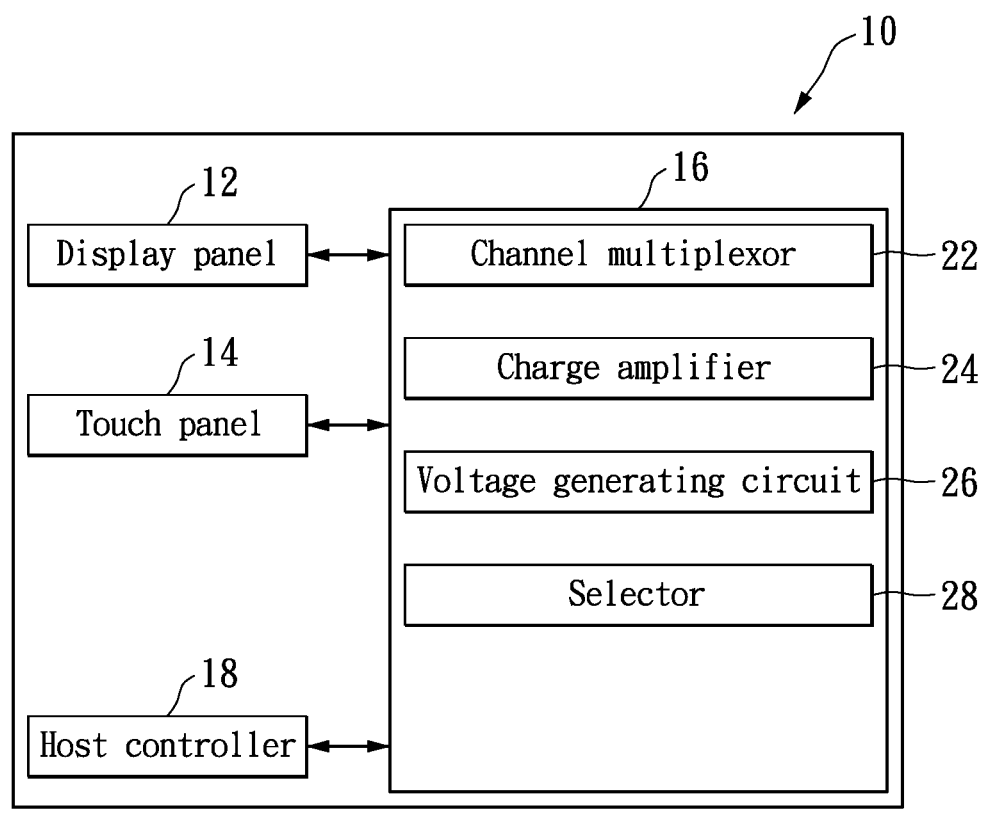
FIG. 1 illustrates a simplified block diagram of a touch system according to one embodiment of the disclosure.

Please refer to FIG. 1 illustrating a simplified block diagram of a touch system 10 according to one embodiment of the disclosure. The touch system 10 may include a display panel 12, a touch panel 14, a driver module 16 for controlling operations of the display panel 12 and the touch panel 16, and a host controller 18 for controlling the driver module 16. The driver module 16 could be a touch display driver IC (DDI).

The driver module 16 may include a channel multiplexer 22 and a charge amplifier 24. The channel multiplexer 22 may be configured to multiplex signals resulting from the touch input and output a resulting sense output signal to the charge amplifier 24. Upon receiving the resulting sense output signal, the charge amplifier 24 may be configured to convert the sense output signal into an output voltage.

The driver module 16 may also include a voltage generating circuit 26 and a selector 28 adapted to select at least one of transmit electrode. More specifically, the voltage generating circuit 26 may be adapted to apply a first voltage of a first polarity to one of the transmit electrodes selected by the selector 28 and apply a second voltage of a second polarity to another transmit electrode selected by the selector 28.

It is worth noting that the first voltage may be substantially the same as the second voltage in magnitude, while the first polarity may be opposite to the second polarity. Additionally, the application of the first voltage and the second voltage may take place substantially concurrently. And despite the selection of the transmit electrode may be followed by the application of the second voltage to the selected transmit electrode, in order to facilitate the application of the first voltage and the second voltage substantially concurrently both the selection of the transmit electrode receiving the first voltage and the selection of the transmit electrode receiving the second voltage may be predetermined.

Figure 2:
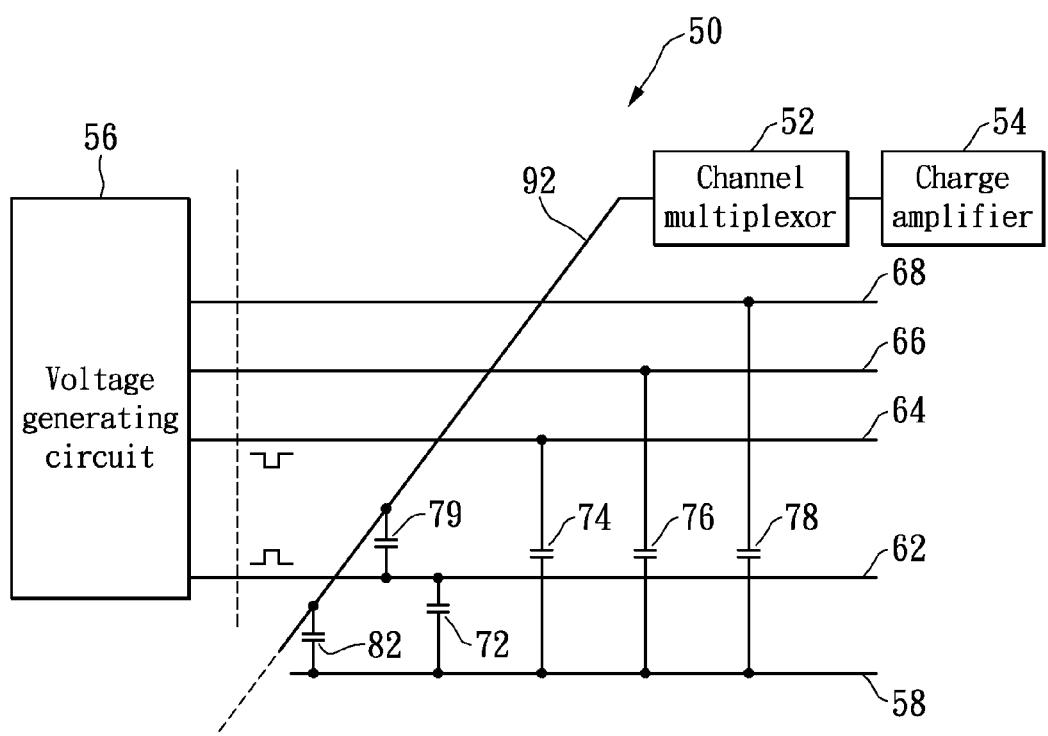
FIG. 2 illustrates a schematic diagram of a touch system according to one embodiment of the disclosure.

Please refer to FIG. 2 illustrating a schematic diagram of a touch system 50 according to one embodiment of the disclosure. Similar to the touch system 10 shown in FIG. 1, the touch system 50 may include a display panel and a touch panel, both of which are not shown in FIG. 2. The touch system 50 may also include a DDI (not shown) having a channel multiplexer 52, a charge amplifier 54, and a voltage generating circuit 56.

The display panel may be associated with a first electrode 58. And the touch panel may include transmit electrodes 62, 64, 66, and 68, and a receive electrode 92 coupled to the transmit electrodes 62, 64, 66, and 68, and the channel multiplexor 52. In one implementation, the first electrode may be a common electrode in the display panel. In another implementation, the first electrode 58 may be the electrode other than the transmit electrodes 62-66 and the receive electrode 92. Specifically, the first electrode 58 may refer to the electrode where the charges associated with the application of the transmit electrodes 62-66 may accumulate.

Parasitic capacitance may be formed between the transmit electrodes 62, 64, 66, and 68, and the first electrode 58. For example, a first parasitic capacitance 72 may be formed between the transmit electrode 62 and the first electrode 58, with a second parasitic capacitance 74 formed between the transmit electrode 64 and the first electrode 58. Meanwhile, a third parasitic capacitance 76 may be formed between the transmit electrode 66 and the first electrode 58, and a fourth parasitic capacitance 78 may be formed between the transmit electrode 68 and the first electrode 58. Another parasitic capacitance (or a fifth parasitic capacitance) may be formed between the receive electrode 92 and the first electrode 58.

For the detection of the touch position, mutual capacitances between the transmit electrodes 62, 64, 66, and 68 and the receive electrode 92 may be measured. And in order to measure the mutual capacitance such as a mutual capacitance 79 between the transmit electrode 62 and the receive electrode 92 a positive voltage pulse may be applied to the transmit electrode 62 by the voltage generating circuit 56.

When the voltage generating circuit 56 applies the positive voltage pulse, which is one example of a first voltage of a first polarity, to the transmit electrode 62 for the touch position detection purpose, positive charges corresponding to the positive voltage pulse may be present at both the receive electrode 92 and the first electrode 58 as result of the presence of the fifth capacitance 82 and the first capacitance 72, respectively. In order to minimize the positive charges present at the first electrode 58, the voltage generating circuit 56 may apply a negative voltage pulse, which may be the same as the positive voltage pulse in magnitude and an example of the second voltage of the second polarity, to the transmit electrode 64. As such, the negative charges corresponding to the negative voltage pulse may be present at the first electrode 58 because of the presence of the second parasitic capacitance 74, offsetting the positive charges corresponding to the positive voltage pulse at the first electrode 58.

In one implementation, the transmit electrode 64, which is adjacent to the transmit electrode receiving the positive voltage pulse, is selected to receive the negative voltage pulse. And since the touch position detection may start from applying the positive voltage pulse to the transmit electrode 62 the transmit electrode 64 may be selected in advance so that the voltage generating circuit 56 may substantially concurrently apply the negative voltage pulse to the transmit electrode. Under this arrangement, the voltage generating circuit 56 may apply the positive voltage pulse to the transmit electrode 64 after applying the negative voltage pulse to the transmit electrode 64 without interrupting the touch position detection.

Instead of the transmit electrode 64 being selected for the receipt of the negative voltage pulse as illustrated in the above, another transmit electrode (e.g., the transmit electrode 66) may be selected for the receipt of the negative voltage pulse. When the transmit electrode 66 is selected, the negative charges may be present at the first electrode 58 because of the presence of the third capacitance 76 to offset the positive charges corresponding to the positive voltage pulse applied to the transmit electrode 62.

When two transmit electrodes (e.g., the transmit electrodes 64 and 66) are selected for offsetting the positive charges present at the first electrode 58, each of the two selected transmit electrodes is adapted to receive the negative pulse that is half in magnitude of that of the negative pulse applied to the transmit electrode as the only transmit electrode selected.

Figure 3:
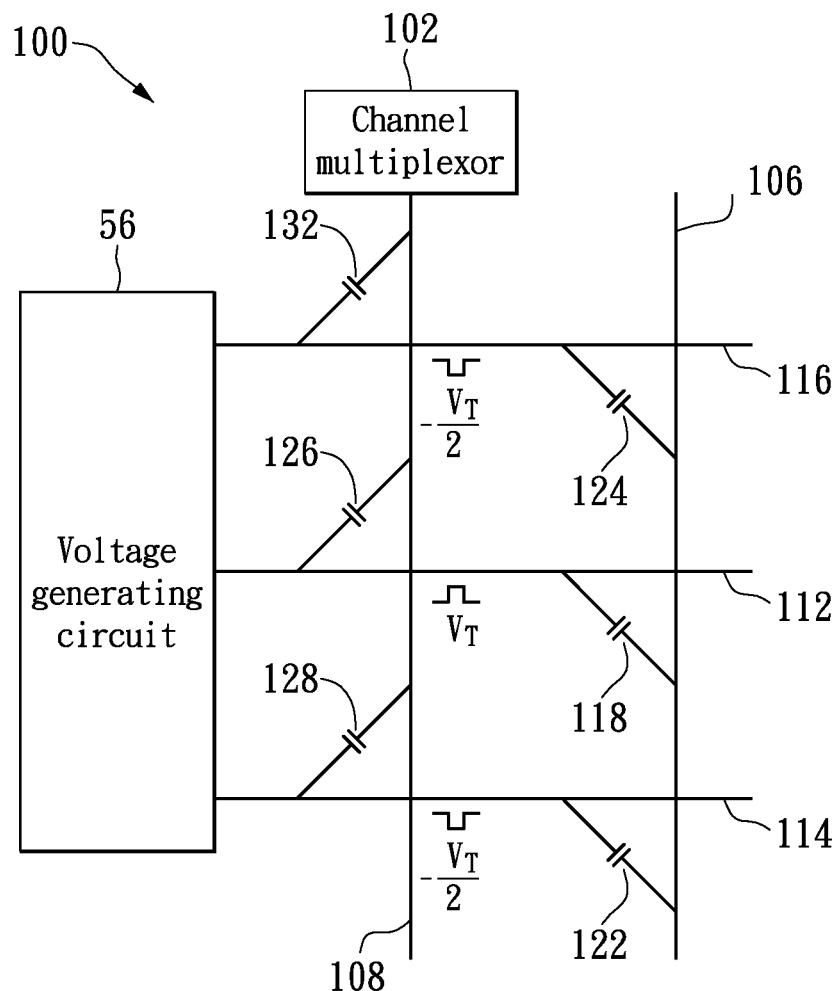
FIG. 3 illustrates a schematic diagram of a touch system when two transmit electrodes are selected for offsetting charges present at a first electrode according to one embodiment of the disclosure.

FIG. 3 illustrates a schematic diagram of a touch system 100 when two transmit electrodes are selected for offsetting charges present at a first electrode according to one embodiment of the disclosed invention. Similar to the touch systems 10 and 50, the touch system 100 may include a display panel, a touch panel, and a DDI having a channel multiplexor 102 and a voltage generating circuit 104. The display panel may be associated with a first electrode 106, while the touch panel may be defined by a receive electrode 108 and multiple transmit electrodes 112, 114, and 116.

Parasitic capacitances 118, 122, and 124 may be formed between the transmit electrode 112 and the first electrode 106, the transmit electrode 114 and the first electrode 106, and the transmit electrode 116 and the first electrode 106, respectively. Mutual capacitances 126, 128, and 132, which may serve as the basis for the detection of the touch position, may form between the transmit electrode 112 and the receive electrode 108, the transmit electrode 114 and the receive electrode 108, and the transmit electrode 116 and the receive electrode 108, respectively. And for measuring the mutual capacitances 126, 128, and 132 a first voltage may be applied to the transmit electrodes 112, 114, and 116 in a predetermined sequence.

When the transmit electrode 112 receives the first voltage at the level of $v_T$ at which point the corresponding positive charge may be present at the first electrode 106 because of the presence of the parasitic capacitance 118, the transmit electrodes 114 and 116 may be selected to receive a second voltage at the level of $$-\frac{v_T}{2}$$

before any of the selected transmit electrodes 114 and 116 may receive the first voltage $v_T$ for the touch position detection. Consequently, the negative charges corresponding to the second voltages of $$-\frac{v_T}{2}$$

may be present at the first electrode 106 because of the parasitic capacitances 122 and 124 to offset the positive charge corresponding to the first voltage of $v_T$ at the first electrode 106.

Similarly, when three transmit electrodes including the transmit electrodes 114 and 116 are selected for offsetting the charges corresponding to the first voltage at the level of $v_T$ applied to the transmit electrode 112 and present at the first electrode 106, another second voltage at the level of $$-\frac{v_T}{3}$$

may be applied to each of the three selected transmit electrodes. Therefore, the positive charges corresponding to $v_T$ present at the first electrode 106 may be offset by the negative charges corresponding to three second voltages $$\left(-\frac{v_T}{3}\right)$$

applied to the transmit electrodes including the transmit electrodes 114 and 116.

In summary, depending on the number of the transmit electrodes selected for the receipt of the second voltage in order to offset the charges corresponding to the first voltage applied to another transmit electrode the second voltage may vary in magnitude though each of the selected transmit electrodes may receive the second voltage in the same magnitude. For example, if N transmit electrodes are selected to receive the second voltage, the magnitude of the received second voltage may be 1/N of that of the first voltage applied to the transmit electrode for the touch position detection.

Additionally, regardless of the number of the transmit electrodes selected to receive the second voltage the selection of the transmit electrodes may start from the transmit electrodes adjacent to the transmit electrode receiving the first voltage. Using FIG. 3 for example, when the transmit electrode 112 is to receive the first voltage the transmit electrodes 114 and 116 that are adjacent to the transmit electrode 112 may be selected to receive the second voltage.

Figure 4:
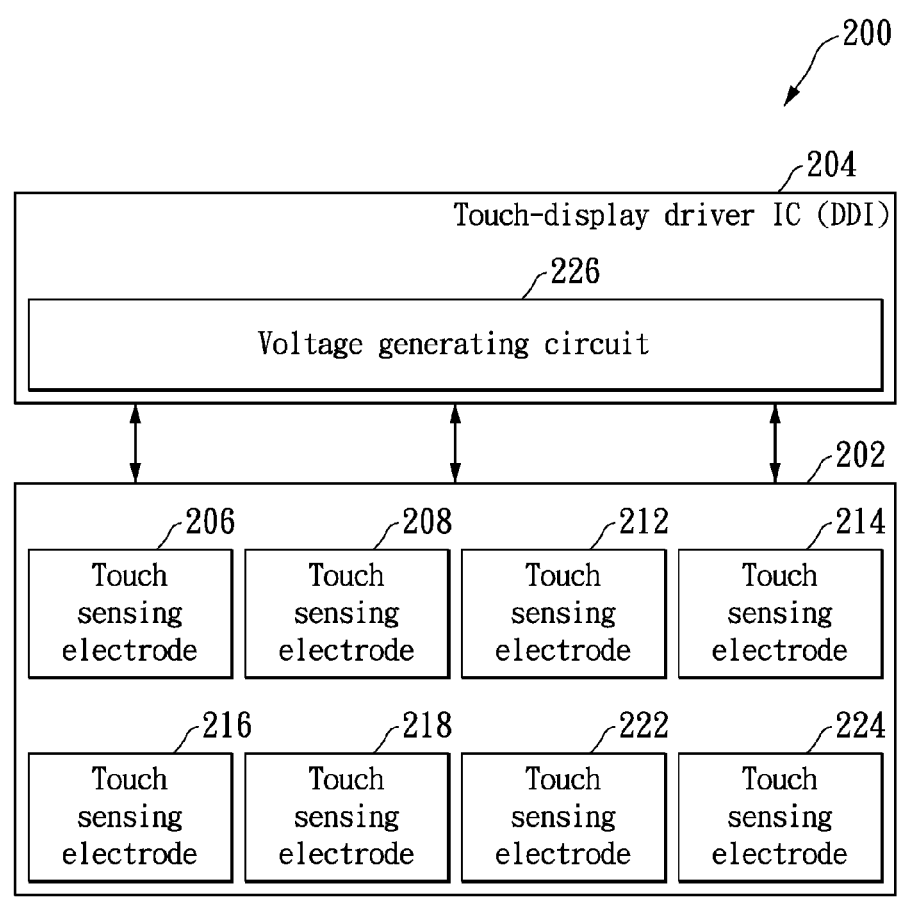
FIG. 4 illustrates a touch system according to one embodiment of the disclosure.

FIG. 4 is a schematic diagram illustrating a touch system 200 according to one embodiment of the disclosure. The touch system 200 may include a touch panel 202 and a DDI 204. The touch panel 202 may include multiple touch electrodes 206-224 while the DDI 204 may include a voltage generating circuit 226 for delivering voltages to the touch electrodes 206-224 so that self-capacitance of the touch electrodes 206-224 may be measured.

Since the touch electrodes 206-224 may be coupled to the same first electrode of a display panel (not shown), when the self-capacitance of any of the touch electrodes 206-224 is measured charges corresponding to the voltage delivered to the touch electrodes 206-224 may accumulate at the first electrode.

Therefore, at the time the self-capacitance of the touch electrode 206 is measured a first voltage of a first polarity may be applied to the touch electrode 206 and a second voltage of a second polarity that may be substantially the same as the first voltage in magnitude may be applied to the touch electrode 208 or 216 that is adjacent to the touch electrode 206 receiving the first voltage. Another touch electrode such as the touch electrode 212, 214, 218, 222, or 224 may be selected to receive the second voltage in another implementation. It is worth noting that the first polarity may be opposite to the second polarity.

When more than one touch electrodes are selected for offsetting the charges corresponding to the application of the first voltage to the touch electrode 206, the second voltage applied to the selected touch electrodes such as the touch electrodes 208 and 216 may be only half as much as the second voltage applied to either the touch electrode 208 or 216 as the only touch electrode selected.

Therefore, depending on the number of the touch electrodes selected for offsetting the charges corresponding to the first voltage applied to the touch electrode the second voltage may vary accordingly, though the selected touch electrodes for the charges offsetting purpose may receive the second voltages of the same voltage level.

Meanwhile, the touch electrode(s) selected for receiving the second voltages(s) may be adjacent to or neighboring the touch electrode receiving the first voltage. It is worth noting, however, the selected touch electrode(s) for receiving the second voltage(s) may not be adjacent to or neighboring the touch electrode receiving the first voltage in another implementation.

Figure 5:
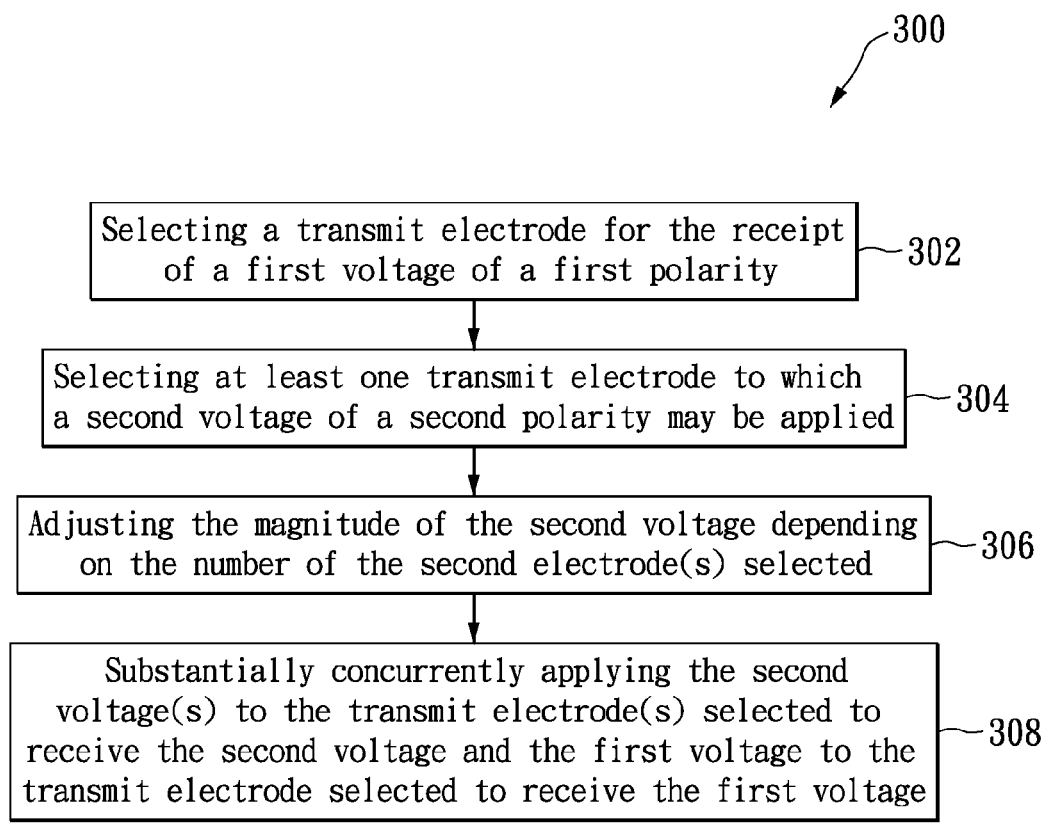
FIG. 5 illustrates a flow chart showing a method capable of minimizing charges accumulated at a first electrode of a display panel according to one embodiment of the disclosure.

In conjunction with FIGS. 1 and 3, please refer to FIG. 5 illustrating a flow chart of a method 300 capable of minimizing charges accumulated at a first electrode according to one embodiment of the disclosure.

The method 300 may includes steps 302-308. It is worth noting that the method 300 may be performed by the DDI 16 or the DDI 204 in FIGS. 1 and 3, respectively. In step 302, the method 300 may include selecting a transmit electrode for the receipt of a first voltage of a first polarity. In one implementation, the selection of the transmit electrode to which the first polarity is applied may be predetermined. For example, the transmit electrode 112 in FIG. 3 may be selected first for the receipt of the first voltage, which is followed by the selection of the transmit electrode 114 or 116 since the detection of the touch position is typically performed in a predetermined sequence.

In step 304, the method 300 further include selecting at least one transmit electrode to which a second voltage of a second polarity may be applied. Since the selection of the transmit electrode receiving the first voltage may be predetermined as previously discussed, the selection of the transmit electrode receiving the second voltage may be performed by selecting the transmit electrode adjacent to the selected transmit electrode receiving the first voltage.

In step 306, the method 300 may further include adjusting the magnitude of the second voltage depending on the number of the second electrodes selected in step 304. For instance, the second voltage may remain substantially the same magnitude as the first voltage when only one transmit electrode is selected to receive the second voltage. The magnitude of the second voltage or the absolute value thereof may be reduced by half in the event that two transmit electrodes are selected to receive the second voltage, compared to the magnitude of the second voltage received by the transmit electrode as the only one transmit electrode selected for offsetting the charges corresponding to the first voltage.

In step 308, the method 300 may substantially concurrently apply the second voltage(s) in magnitude determined in step 306 to the transmit electrode(s) selected to receive the second voltage and the first voltage to the transmit electrode selected to receive the first voltage.

The descriptions illustrated supra set forth simply the embodiments of the disclosure; however, the characteristics of the disclosure are by no means restricted thereto. All changes, alternations, or modifications conveniently considered by those skilled in the art are deemed to be encompassed within the scope of the disclosure delineated by the following claims.

What is claimed is:

1. A touch system, comprising:
    a display panel having a first electrode; and a touch panel having a plurality of touch electrodes,
        wherein the first electrode is different from the touch electrode; and
        a voltage generating circuit;
        wherein the voltage generating circuit applies a first voltage of a first polarity to a selected touch electrode, and
        substantially concurrently applies a second voltage of a second polarity that is opposite to the first polarity to each of corresponding x touch electrodes adjacent to the selected touch electrode receiving the first voltage for minimizing charges associated with an application of the first voltage to the selected touch electrode accumulated at the first electrode, wherein x is an integer larger than one.

2. The touch system according to claim 1, wherein the first voltage is x times the magnitude of each of the second voltage applied to each of the corresponding x touch electrodes.

3. The touch system according to claim 1, further comprising a selector electrically coupled to the voltage generating circuit and the touch panel, for selecting one of the touch electrodes to which the first voltage is applied, and for selecting the corresponding x touch electrode to which the second voltage is applied.

4. The touch system according to claim 1, wherein the touch electrodes are arranged in a co-planar manner.

5. The touch system according to claim 1, wherein the touch electrodes comprise a plurality of transmit electrodes and a plurality of receive electrodes, and the transmit electrodes and the receive electrodes cross each other and are electrically isolated, wherein the first and the second voltages amply to the plurality of transmit electrodes.

6. A method for minimizing charges accumulated at a first electrode of a display panel of a touch system, wherein the touch system comprises a touch panel with a plurality of touch electrodes and the first electrode is different from the touch electrodes, the method comprising:

determining x touch electrodes that are adjacent to a selected touch electrode to which a first voltage of a first polarity is applied; and substantially concurrently applying a second voltage of a second polarity opposite to the first polarity to each of the determined x touch electrodes, wherein x is an integer larger than one.

7. The method according to claim 6, further comprising causing the first voltage to be x times the magnitude of each of the second voltage applied to each of the corresponding x touch electrodes.

8. The method according to claim 6, wherein the touch electrodes comprise a plurality of transmit electrodes and a plurality of receive electrodes, and the transmit electrodes and the receive electrodes cross each other and are electrically isolated.

9. The method according to claim 5, wherein the touch electrodes are arranged in a co-planar manner.

* * * * *